United States Patent
Kitagawa et al.

(10) Patent No.: US 6,773,843 B2
(45) Date of Patent: Aug. 10, 2004

(54) PORTABLE FUEL CELL STACK

(75) Inventors: Koji Kitagawa, Nagoya (JP); Eiji Kato, Nagoya (JP); Yukio Naruse, Nagoya (JP); Takashi Inaba, Nagoya (JP); Yasuo Ido, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 325 days.

(21) Appl. No.: 10/093,934

(22) Filed: Mar. 11, 2002

(65) Prior Publication Data

US 2002/0127453 A1 Sep. 12, 2002

(30) Foreign Application Priority Data

Mar. 9, 2001 (JP) ........................................ 2001-066109

(51) Int. Cl.[7] .............................. H01M 8/10; H01M 8/24
(52) U.S. Cl. ............................. 429/32; 429/30; 429/37; 429/38; 429/39
(58) Field of Search ............................. 429/32, 30, 37, 429/38, 39

(56) References Cited

U.S. PATENT DOCUMENTS

| 5,514,486 A | 5/1996 | Wilson |
| 5,595,834 A | 1/1997 | Wilson et al. |

FOREIGN PATENT DOCUMENTS

EP 0 823 743 A2 2/1998

Primary Examiner—Hoa Van Le
(74) Attorney, Agent, or Firm—Browdy and Neimark, PLLC

(57) ABSTRACT

A portable fuel cell stack is provided in which the number of components is reduced by reducing the number of flow field plates, cell performance is improved by reducing the number of contact portions to thereby lower internal resistance, and fuel is supplied from the center of an end plate directly to a fuel distribution manifold. The portable fuel cell stack includes two end plates, a plurality of unit cells positioned between the two end plates, a fuel distribution manifold positioned in the center of the unit cell for fuel supply thereto, a tie bolt passed through the centers of the fuel manifold and the unit cell for integration of these members, and fixing nuts threaded to both ends of the tie bolt for integrally clamping the plurality of unit cells together between the end plates via an O-ring, etc. The unit cell includes a polymer electrolyte membrane, an oxygen electrode and a fuel electrode installed on both sides of the polymer electrolyte membrane, a flow field plate adjacent to the oxygen electrode side, and a separator plate on the outside of the flow field plate adjacent in contact therewith and another separator plate on the outside of the fuel electrode side in contact therewith. One of the fixing nuts has a fuel supply port connecting to the fuel distribution manifold.

4 Claims, 5 Drawing Sheets

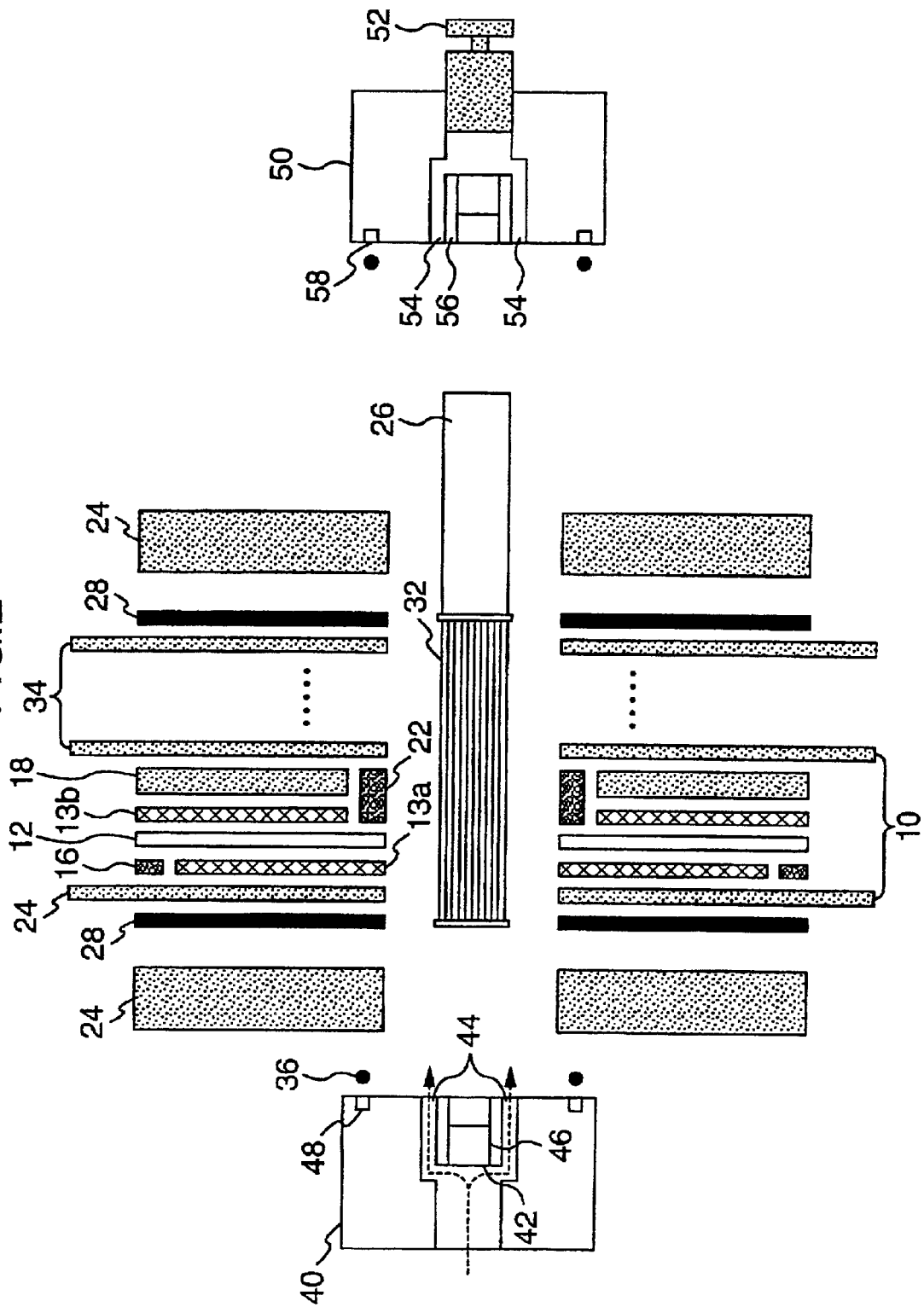

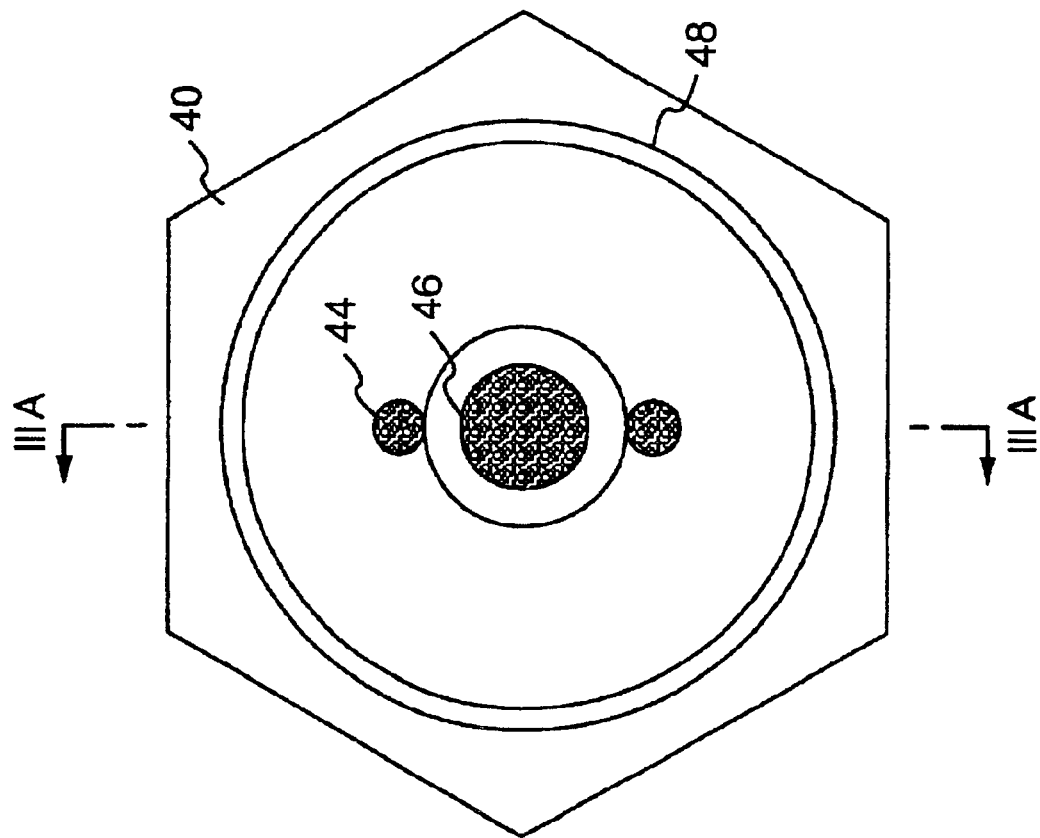
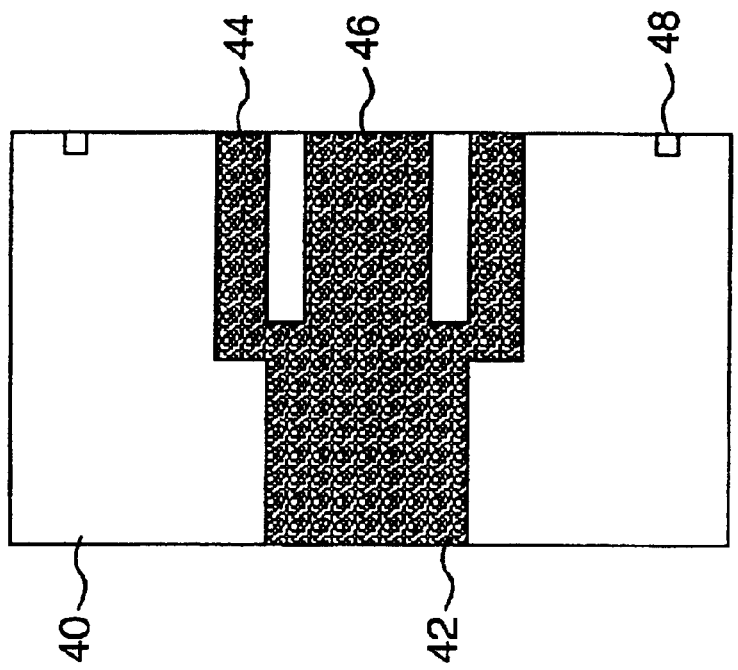

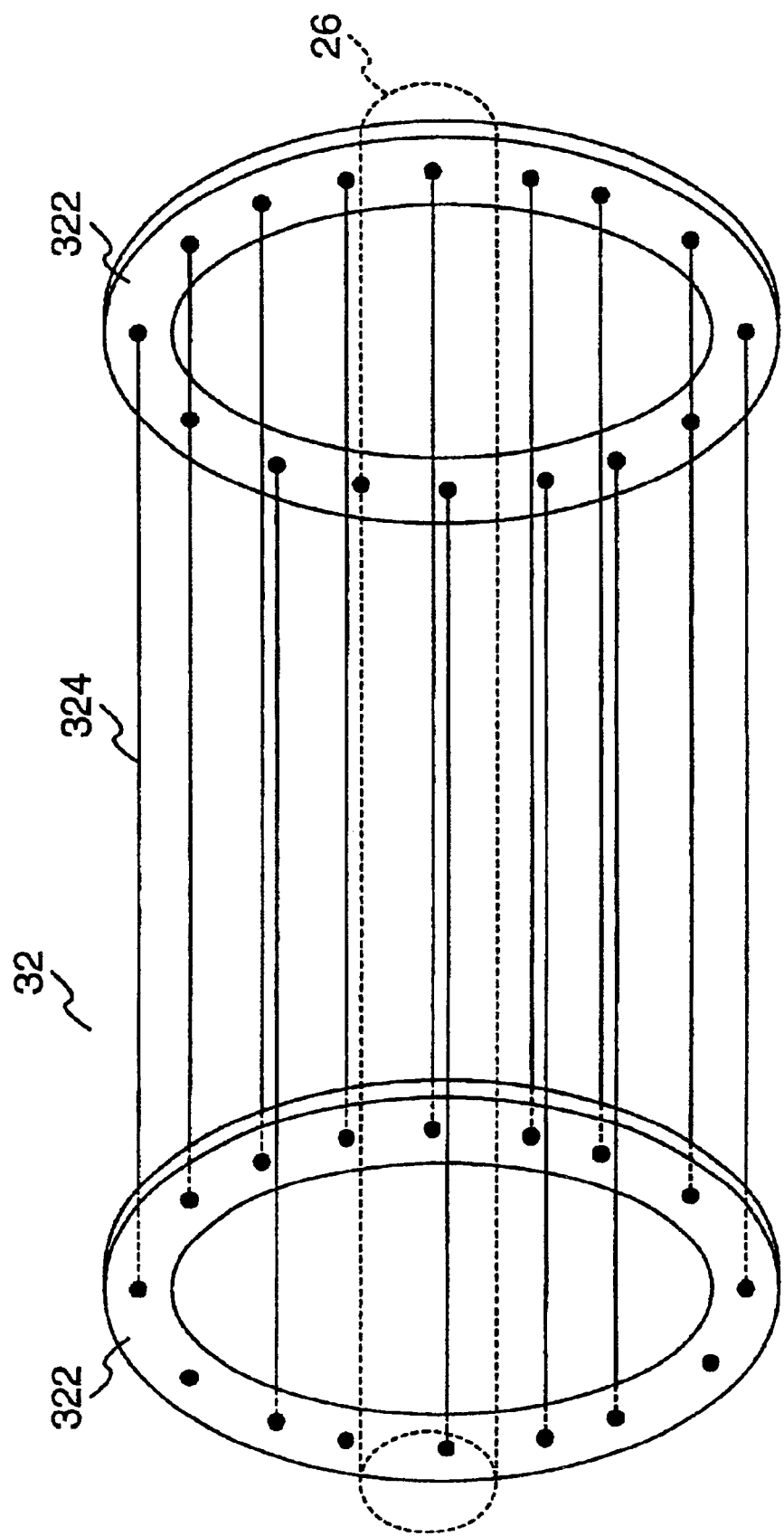

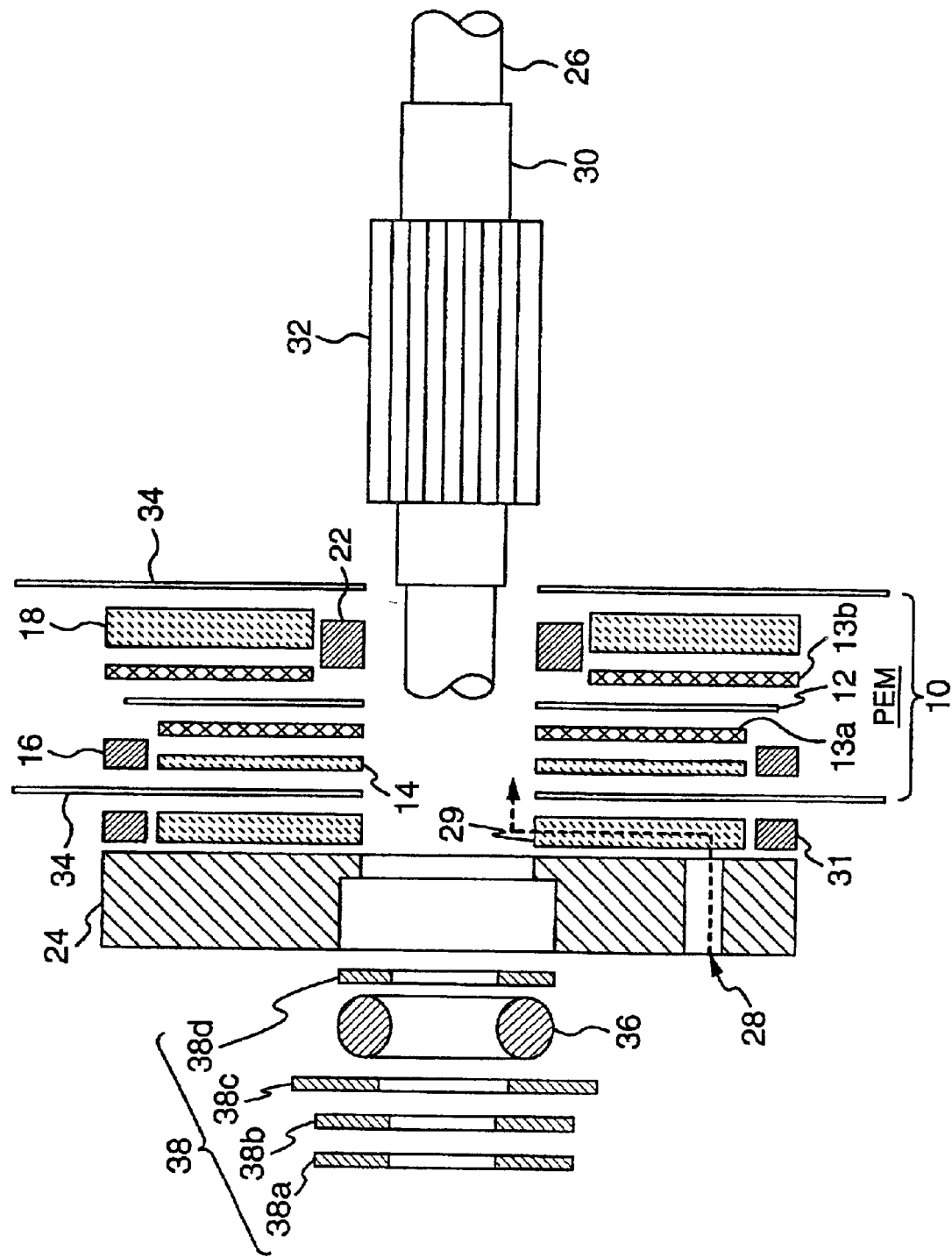

PORTABLE FUEL CELL STACK

BACKGROUND OF THE INVENTION

The present invention relates to a portable fuel cell stack which can be used in various applications, such as a power source for outdoor activities and picnics and a household generator, and which uses light, silent and pollution-free solid polymer cells.

Fuel cell stacks generally use hydrogen as a main fuel and take out the energy generated during the chemical reaction of this hydrogen with oxygen. There are several types of fuel cell stack and one type is a solid polymer electrolyte fuel cell stack. This solid polymer electrolyte fuel cell stack has features such as low operating temperature and high output density.

An example of fuel cell stack in which such conventional solid polymer electrolyte fuel cell stack is disclosed in U.S. Pat. No. 5,595,834. As shown in FIG. 5, a unit cell 10 comprises a solid polymer electrolyte membrane 12, an anode (fuel electrode) 13a and a cathode (oxygen electrode) 13b, which are provided on both sides of the solid polymer electrolyte membrane 12, a fuel flow field plate 14 and an oxygen flow field plate 18, which are provided on sides of these electrodes 13a and 13b, and separator plates 34, which are provided on sides of these flow field plates 14 and 18, to form the unit cell 10 by making them integral with each other. A plurality of unit cells 10 are stacked, and the stacked unit cells 10 are formed as a whole construction by inserting a fuel distribution manifold, which comprises a hydrophilic sleeve 32 connected to the fuel flow field plate 14, into a center hole of the unit cell 10, by further providing end plates 24 on both ends of a bolt 26, which is passed through the center of the sleeve 32, so as to sandwich them between the two ends of the bolt 26, and by fastening and fixing the whole by means of nuts via washers 38a to 38d and an O-rings 36. Because such fuel cell stacks are suitable for low power fuel cells, they can be designed as small-sized and lightweight fuel cell stacks.

Furthermore, in this polymer electrolyte fuel cell stack, a fuel feed flow field plate 29 is provided between one end plate 24 and the separator plate 34 adjacent to the unit cell 10 to provide communication with the hydrophilic sleeve 32, which constitutes the fuel distribution manifold for supplying fuel to the fuel flow field plate 14, and a port 28 is provided in the outer peripheral portion of the end plate 24 so that fuel is introduced into the port 28 and supplied to the fuel flow field plate 14.

However, in the above conventional electrolyte fuel cell stack, because the two electrodes of anode (fuel electrode) 13a and cathode (oxygen electrode) 13b are provided on both surfaces of the solid polymer electrolyte membrane 12 and the fuel flow field plate 14 and oxygen flow field plate 18 are provided on sides of these electrodes 13a and 13b, there are many contact portions, with the result that internal resistance is large and that the performance of the whole cell stack decreases.

Moreover, the above conventional electrolyte fuel cell stack not only has a large number of components, such as the fuel flow field plate 14 and fuel feed flow field plate 29 on the fuel supply side and the port 28 of the end plate 24 for fuel supply, but also is of a construction that fuel is fed from the side of the end plate 24 toward the center via the fuel feed flow field plate 29, resulting in an increase both in the flow resistance of the fuel supply passage and in the concentration fluctuation of fuel, thus having an influence on stable energy supply. Using a large number of components causes burdensome maintenance, complex shape and large size.

The present invention was made in view of the foregoing problems. Accordingly, an object of the invention is to provide a portable fuel cell stack in which the number of components is reduced by reducing the number of flow field plates, cell stack performance is improved by reducing the number of contact portions to thereby lower internal resistance, fuel is fed and supplied from the center of an end plate directly to a fuel distribution manifold.

Another object of the invention is to provide a portable fuel cell stack which is capable of being further reduced in size and weight by reducing the number of components.

SUMMARY OF THE INVENTION

In the first concept of the invention for achieving the above objects, a unit cell is provided in an electrolytic fuel cell stack, which includes a polymer electrolyte membrane, an oxygen electrode and a fuel electrode provided on both sides of the polymer electrolyte membrane, a flow field plate installed on the oxygen electrode side, a separator plate installed on the outside of the flow field plate on the oxygen electrode side so as to be in contact therewith, and another separator plate installed on the outside of the fuel electrode so as to be in contact therewith.

According to this first concept, the following advantageous effects are obtained:

(1) Because the flow field plate installed on the fuel electrode side in the conventional electrolyte fuel cell stack is not provided, the number of contact surfaces decreases by two surfaces and the electric resistance in the contact portions decreases so as to lead to a decrease in internal resistance and make it possible to perform the energy generation of the cell stack efficiently.
(2) Because the number of parts of a unit cell decreases, it is possible to make an inexpensive product as a whole and the assembling of unit cells becomes easy, making it possible to increase the production efficiency.

The second concept of the invention is characterized in that one of the fixing nuts has a fuel supply port which provide communication with the fuel distribution manifold for fuel supply from the center of the end plate.

By this second concept, the following effects are obtained:

(3) Because the fuel is directly supplied to the fuel distribution manifold without flowing through the fuel flow field, the flow resistance decreases and fuel supply can be smoothly performed. In addition, the concentration fluctuation in fuel supply can be reduced. Therefore, stable power generation can be carried out.
(4) Because the fuel flow field in the cell stack was eliminated, the number of components of the cell stack can be reduced and besides the cell stack can be reduced in size and weight.

Furthermore, by the third concept of the invention, the fuel distribution manifold is formed by arranging hydrophilic synthetic fiber threads on a tie bolt in the axial direction of the tie bolt.

(5) Because this fuel distribution manifold by the third concept uses hydrophilic synthetic fibers, it is possible to select a material for the fuel distribution manifold from easily obtainable ones and the fuel distribution manifold can be easily formed because of low cost and easy handling.

In addition, according to the fourth concept of the invention, the other fixing nut is provided with a bleeder valve capable of supplying fuel to the flow field plate, etc. by one-touch operation at the end of the bolt.

(6) Because the other fixing nut according to the fourth concept is provided with a bleeder valve, during the startup of the fuel cell stack, fuel can be supplied in a sufficient amount by one-touch operation to the fuel electrode side of the polymer electrolyte membrane, whereby the power generation action during startup can be smoothly started.

BRIEF DESCRIPTION OF THE DRAWINGS

FIG. 2 is an exploded sectional view of the portable fuel cell stack shown in FIG. 1;

FIG. 3A is a sectional view of a fixing nut on the fuel supply side used in the portable fuel cell stack shown in FIG. 1 and is taken along the line IIIA—IIIA of FIG. 3;

FIG. 3B is a front view as viewed from the right side of FIG. 3A;

FIG. 4 is a side view of a fuel distribution manifold used in the portable fuel cell stack shown in FIG. 2; and FIG. 5 is an exploded longitudinal-sectional view of a conventional polymer electrolyte fuel cell stack.

DETAILED DESCRIPTION OF THE PREFERRED EMBODIMENTS

Figure 1:
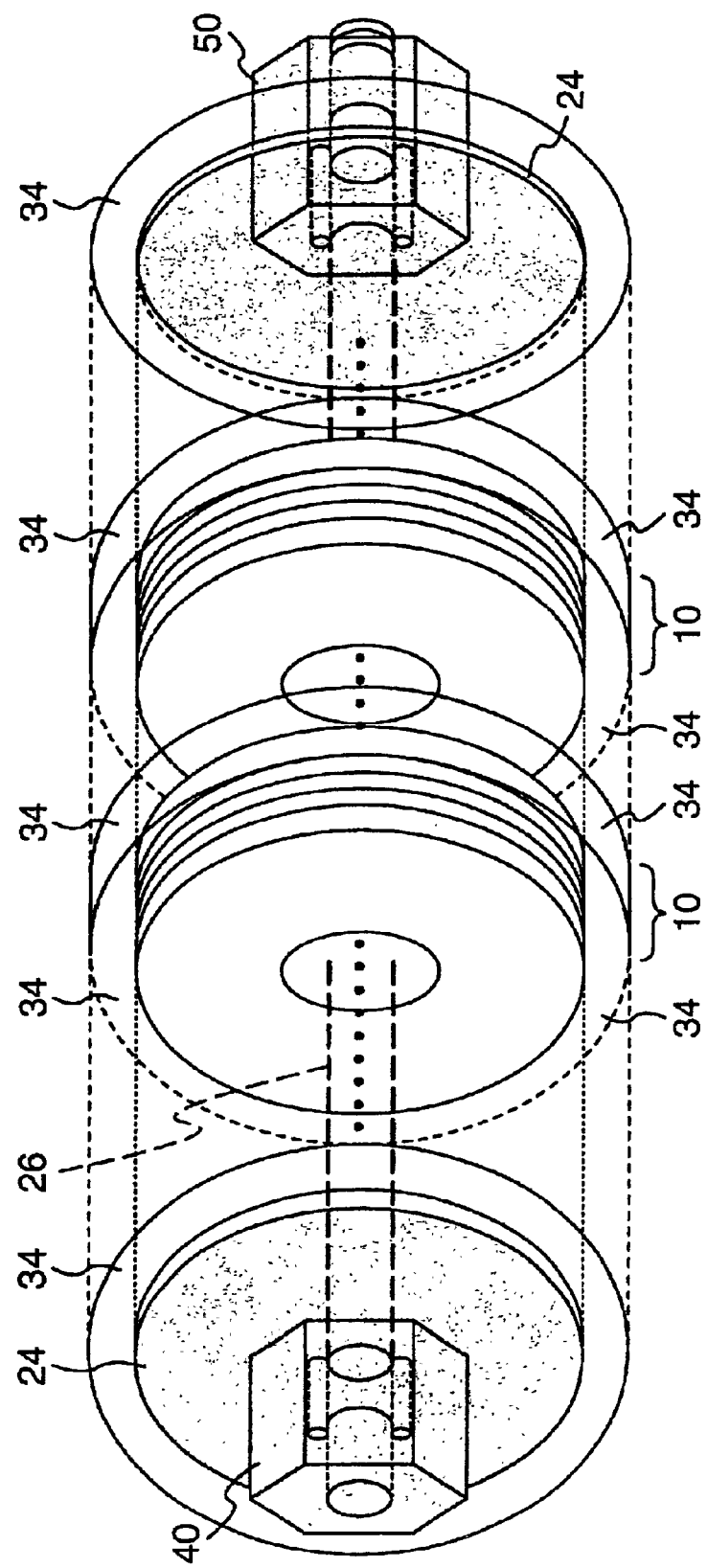
FIG. 1 is a schematic perspective view of a portable fuel cell stack according to one embodiment of the invention.

Embodiments of the invention are described in detail below with reference to the accompanying drawings.

FIG. 1 is a perspective view of the assembled condition of a portable fuel cell stack according to one embodiment of the invention and FIG. 2 is an exploded sectional view of this portable fuel cell stack. This portable fuel cell stack is called a solid polymer electrolyte fuel cell stack in which a fuel of hydrogen, etc. is used. This portable fuel cell stack includes a solid polymer electrolyte membrane 12, which is formed from a perfulorocarbon sulfonic acid polymer material of 0.05 mm thickness, between stainless steel separator plates 34 of 0.3 mm thick having a larger diameter than other members, a fuel electrode 13a having a size of 0.5 mm thickness, an inside diameter of 15 mm and an outside diameter of 45 mm and an oxygen electrode 13b having a size of 0.5 mm thickness, an inside diameter of 19 mm and an outside diameter of 55 mm, which are arranged on both sides of the solid polymer electrolyte membrane 12 and are fabricated from a sheet-like carbon material, an oxygen flow field plate 18 having a size of 3.5 mm thickness, an inside diameter of 19 mm and an outside diameter of 55 mm, which is disposed on the outside of the oxygen electrode 13b, an outer seal 16 having an annular shape of 2 mm width, which seals the outer peripheral portion of the fuel electrode 13a and is fabricated from a synthetic rubber such as EPDM, and an inner seal 22 of 5 mm width, which seals the inner peripheral portions of the oxygen electrode 13b and oxygen flow field plate 18. In the following embodiments, fuel is mainly hydrogen, and oxygen is the oxygen contained in the air and is supplied in the form of air. Furthermore, the solid polymer electrolyte membrane 12 is coated with a catalyst for chemical reaction.

The unit cell 10 has an opening at its center portion so that an exact number of unit cells suited to an output to be required are stacked together for integration, and through this opening passes a tie bolt 26 having a size of 6 mm diameter and 100 mm length, on the outside of which a fuel distribution manifold 32 of hydrophilic synthetic fiber threads made of aromatic polyamide (Product Name: KEVLAR) which is disposed in the axial direction and the stacked unit cells are installed in such a way as to surround the fuel distribution manifold 32. Between a separator plate 34 of the outermost unit cell 10 and an end plate 24 is sandwiched an end gasket 28 made of synthetic rubber such as EDM, and stainless steel nuts 40, 50 are screwed onto threads cut on both ends of the tie bolt 26 opposite to each of the end plates 24, 24 of epoxy resin having a size of 10 mm thickness, 15 mm inside diameter and 55 mm outside diameter, whereby a plurality of unit cells 10 can be integrally fixed to each other.

In a nut 40 for integrating such unit cells 10 as a single construction is formed a hollow hole 42 in the center portion thereof, as shown in FIGS. 3A and 3B, which are a sectional view and side view of the nut, respectively, and on the opposite side an inner thread 46 is cut up to the center portion in the axial direction, thereby allowing the tie bolt 26 to be screwed in. At the same time, on the outside of the inner thread 46, fuel flow fields 44 are provided at least in two places and these fuel flow fields communicate with the hollow hole 42, thereby forming a fuel supply port that permits fuel supply to the fuel distribution manifold 32. A circular groove 48 into which an O-ring 36 is to be fitted is formed on the surface of the nut 40 in contact with the end plate 24.

Furthermore, as shown in FIG. 2, the other nut 50 has also an inner thread 56 cut up to substantially the center portion in the axial direction, as with the nut 40, so that the end of the tie bolt 26 can be screwed in, and on the outside in the radial direction of the nut 50 are formed pores 54 which provide communication with the fuel distribution manifold 32. On the opposite side of the inner thread 56 in the axial direction is installed a bleeder valve 52 made of stainless steel, and this bleeder valve 52 allows fuel to be charged by one-touch operation so that the bleeder valve 52 can assist in filling by performing fuel supply to and discharge from the fuel distribution manifold 32 and fuel electrode 13a via the communicating pores 54. A circular groove 58 into which an O-ring is to be fitted is formed on the surface of the nut 50 in contact with the end plate 24.

As shown in FIG. 4, for fuel supply and for the absorption and holding of generated water, the fuel distribution manifold 32 is formed by extending and engaging hydrophilic synthetic fiber threads 324 to flanges 322 provided at both ends of a cylindrical housing to thereby stretch the threads over the surface of the cylinder and arrange them in the axial direction thereof.

A portable fuel cell stack of the foregoing construction can be assembled as follows.

First, with the nut 40 attached beforehand to one end of the tie bolt 26, preferably in a vertically-erected condition, the fuel distribution manifold 32 is attached to the nut 40 so as to cover it. The tie bolt 26 thus covered with the fuel distribution manifold 32 provides the center shaft of the fuel cell stack.

With respect to this center shaft, the outermost end plate 24 and end gasket 28 are sequentially inserted into the center hole to thereby make preparations, and then in such a way as to form the unit cell 10, the separator plate 34, a fuel electrode 13a, an outer seal 16 positioned on the outside thereof in the radial direction, solid polymer electrolyte membrane 12, inner seal 22, oxygen electrode 13b and oxygen flow field plate 18 both positioned on the outside thereof in the radial direction, and separator plate 34 are sequentially stacked by inserting the center shaft into the center hole of these components to thereby form an assemblage.

After that, for the next unit cell 10, with respect to the last separator 34 of the preceding unit cell 10, as with the preceding unit cell 10, the fuel electrode 13a, outer seal 16 positioned on the outside thereof in the radial direction, solid polymer electrolyte membrane 12, inner seal 22, oxygen electrode 13b and oxygen flow field plate 18 both positioned on the outside thereof in the radial direction, and separator plate 34 are inserted into the center shaft to be assembled. An exact number of unit cells 10 suited to a prescribed output of a portable fuel cell stack are stacked and assembled by repeating the above steps.

Lastly, with respect to the separator plate 34 of the outermost unit cell 10, the end plate 24 is placed with the end gasket 28 sandwiched therebetween by inserting the center shaft into the center hole of the end plate 24. The stack of unit cells 10 is pressed with a prescribed pressure, for example, about 15 MPa. In this state, the other nut 50 provided with the bleeder valve 52 is screwed onto the thread at the end of the tie bolt 26 of center shaft, and the whole stack is tightened with a prescribed torque, for example, 6.8 Nm and fixed.

In the fuel cell stack thus assembled, which is to serve as a portable fuel cell stack, a tube, etc. are further connected to the nut 40 so that fuel from a hydrogen generator, etc. can be supplied. Through the hollow hole 42, which serves as the fuel supply port of the nut 40, and the fuel flow field 44, fuel such as hydrogen is supplied to the fuel distribution manifold 32 and is further fed to the inner end portion of the fuel electrode 13a of each unit cell 10 by means of the fuel distribution manifold 32 along the tie rod 26. The fuel electrode 13a, which is formed from a sheet-like carbon material, can feed fuel in the radial direction through the voids of its porous material without the special need as provides a fuel flow field plate. Furthermore, because its outer peripheral portion is sealed by the outer seal, the fuel electrode 13a can feed fuel in such a manner as to supply it to the solid polymer electrolyte membrane 12. Because on the opposite side of this solid polymer 12 are provided the oxygen electrode 13b and oxygen flow field plate 18, air is fed from the outside through the voids of a porous material of the oxygen flow field plate 18 and the oxygen in the air is supplied to the oxygen electrode 13b.

Thus, the fuel and oxygen fed to both sides of the solid polymer electrolyte membrane 12 undergo a chemical reaction therein, with the result that the fuel electrode and oxygen electrode become an anode and a cathode, respectively, so as to perform a power generation action. On that occasion, a hydration action leads to the formation of water and heat generation. The generated water is absorbed by the hydrophilic synthetic fiber threads 324 in the fuel distribution manifold 32, so that the possibility is eliminated that the water formed in the fuel distribution manifold 32 might collect and impede fuel supply to the fuel electrode 13a. Furthermore, the water evaporates due to the generated heat and is dissipated to the air. In addition, because the separator plate 34 has a larger radius than that of other components, it can enable the portion projecting from other components to function as a radiating fins so that the generated heat can be radiated.

Furthermore, because fuel supply to the fuel electrode 13a is directly performed without installation of a fuel flow field plate, the number of parts in contact is small. Therefore, internal resistance decreases by an amount corresponding to reduced portions in direct contact and, therefore, the performance of the fuel cell stack can be kept stable. At the same time, by reducing the number of parts, the cost of manufacture can be lowered. This is because the molecules of hydrogen gas, which is the fuel, are the smallest molecules in comparison with other gases, hydrogen molecules can rapidly reach the polymer electrolyte membrane 12 even without using a fuel flow field owing to the formation of the fuel electrode 13a from a porous material.

Incidentally, the sizes of the components in the above embodiments are not limited to those given in the foregoing descriptions and it is needless to say that they are mere examples. These sizes should be determined according to uses and required output.

The portable fuel cell stack of the invention yields the following effects owing to the essential features of the invention described above.

In the above portable fuel cell stack, on the fuel electrode side of the polymer electrolyte membrane, the unit cell has only the fuel electrode between the polymer electrolyte membrane and the separator plate and, therefore, fuel is supplied by the fuel electrode directly in the radial direction along the polymer electrolyte membrane. Therefore, only a portion in contact with the fuel electrode exists and other contact portions do not exist. Therefore, the internal resistance of contact portions is reduced and the energy generation by the cell stack can be efficiently performed, thus yielding an excellent effect.

Furthermore, the number of parts of the unit cell decreases and a simple construction is possible. This yields the effect that the polymer electrolyte fuel cell stack can be made as an inexpensive product as a whole.

Moreover, for fuel supply to the fuel cell unit from the outside, fuel supply ports are provided in the fixing nuts for clamping stacked unit cells together. Therefore, it is possible to supply fuel directly to the fuel distribution manifold without the need to separately install part of the end plate or a member for fuel supply, the flow field resistance in fuel supply is reduced, and the number of components can be reduced, yielding the effect that the portable fuel cell stack can be made small in size and weight.

In addition, the use of hydrophilic synthetic fiber threads in the fuel distribution manifold yields the effect that the fuel distribution manifold can be easily formed from an obtainable material without using a special device.

Furthermore, because the bleeder valve is attached to the nut on the side opposite to the side of the fixing nut where the fuel supply ports are provided, the fuel electrode can be filled with fuel by one-touch operation at the start of the fuel cell stack. This yields the effect that the power generation action during startup can be early and smoothly started up.

What is claimed is:

1. A portable fuel cell stack comprising two end plates, a plurality of unit cells positioned between said two end plates, a fuel distribution manifold positioned in the center of said unit cell for fuel supply thereto, a tie bolt passed through the centers of said fuel manifold and said unit cell for integration of these members, and fixing nuts threaded to both ends of said tie bolt for integrally clamping said plurality of unit cells together between the end plates via an O-ring, etc., wherein said unit cell includes a polymer electrolyte membrane, an oxygen electrode and a fuel electrode installed on both sides of said polymer electrolyte membrane, a flow field plate on the outside of said oxygen electrode so as to be adjacent thereto, and a separator plate on the outside of said flow field plate so as to be adjacent thereto and another separator plate on the outside of said fuel electrode so as to be adjacent thereto.

2. A portable fuel cell stack according to claim 1, wherein one of said fixing nuts has a fuel supply port connecting to said fuel distribution manifold for fuel supply from the center of said end plate.

3. A portable fuel cell stack according to claim 1, wherein said fuel distribution manifold is formed by arranging hydrophilic synthetic fiber threads on said tie bolt in the axial direction thereof.

4. A portable fuel cell stack according to claim 1, wherein the other of said fixing nuts is provided with a bleeder valve capable of charging the fuel into said fuel electrode, etc. by one-touch operation at the end of said bolt.

* * * * *